United States Patent
Riedmiller et al.

(10) Patent No.: US 12,346,786 B2
(45) Date of Patent: *Jul. 1, 2025

(54) DATA-EFFICIENT REINFORCEMENT LEARNING FOR CONTINUOUS CONTROL TASKS

(71) Applicant: DeepMind Technologies Limited, London (GB)

(72) Inventors: Martin Riedmiller, Balgheim (DE); Roland Hafner, Balgheim (DE); Mel Vecerik, London (GB); Timothy Paul Lillicrap, London (GB); Thomas Lampe, London (GB); Ivaylo Popov, Ruse (BG); Gabriel Barth-Maron, London (GB); Nicolas Manfred Otto Heess, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,440

(22) Filed: Jul. 12, 2023

(65) Prior Publication Data

US 2024/0062035 A1 Feb. 22, 2024

Related U.S. Application Data

(63) Continuation of application No. 16/882,373, filed on May 22, 2020, now Pat. No. 11,741,334, which is a
(Continued)

(51) Int. Cl.
*G06N 3/00* (2023.01)
*G06F 18/21* (2023.01)
(Continued)

(52) U.S. Cl.
CPC ......... *G06N 3/006* (2013.01); *G06F 18/2148* (2023.01); *G06F 18/2185* (2023.01);
(Continued)

(58) Field of Classification Search
CPC ........... G06N 3/045; G06N 3/08; G06N 3/088
See application file for complete search history.

(56) References Cited

U.S. PATENT DOCUMENTS

| 2015/0100530 | A1* | 4/2015 | Mnih | A63F 13/67 706/25 |
| 2017/0024643 | A1* | 1/2017 | Lillicrap | G06N 3/006 |
| 2019/0354813 | A1 | 11/2019 | Riedmiller et al. | |

FOREIGN PATENT DOCUMENTS

CN 106056213 10/2016

OTHER PUBLICATIONS

Barron et al ("Parallelizing Reinforcement Learning" 2009) (Year: 2009).*

(Continued)

*Primary Examiner* — Lut Wong
(74) *Attorney, Agent, or Firm* — Fish & Richardson P.C.

(57) ABSTRACT

Methods, systems, and apparatus, including computer programs encoded on computer storage media, for data-efficient reinforcement learning. One of the systems is a system for training an actor neural network used to select actions to be performed by an agent that interacts with an environment by receiving observations characterizing states of the environment and, in response to each observation, performing an action selected from a continuous space of possible actions, wherein the actor neural network maps observations to next actions in accordance with values of parameters of the actor neural network, and wherein the system comprises: a plurality of workers, wherein each worker is configured to operate independently of each other worker, wherein each worker is associated with a respective agent replica that
(Continued)

interacts with a respective replica of the environment during the training of the actor neural network.

11 Claims, 5 Drawing Sheets

Related U.S. Application Data continuation of application No. 16/528,260, filed on Jul. 31, 2019, now Pat. No. 10,664,725, which is a continuation of application No. PCT/IB2018/000051, filed on Jan. 31, 2018.

(60) Provisional application No. 62/452,930, filed on Jan. 31, 2017.

(51) Int. Cl.
```
G06F 18/214    (2023.01)
G06N 3/006     (2023.01)
G06N 3/045     (2023.01)
G06N 3/08      (2023.01)
G06N 3/088     (2023.01)
```
(52) U.S. Cl.
CPC ............. *G06N 3/045* (2023.01); *G06N 3/08* (2013.01); *G06N 3/088* (2013.01)

(56) References Cited

OTHER PUBLICATIONS

Grondman et al ("A survey of actor-critic reinforcement learning: standard and natural policy gradients" 2012) (Year: 2012).*
Office Action in Chinese Appln. No. 201880014744.5, dated Dec. 14, 2023, 13 pages (with English translation).
Bagnell et al, "Autonomous helicopter control using reinforcement learning policy search methods" IEEE International Conference, 2001, 6 pages.
Boularias et al, "Relative entropy inverse reinforcement learning" JMLR Workshop and Conference Proceedings vol. 15, Apr. 2011, 8 pages.
Deisenroth et al, "A survey on policy search for robotics" Foundations and Trends in Robotics, 2011, 145 pages.
EP Office Action in European Appln. 18707406.7-1221, dated Aug. 6, 2019, 3 pages.
Finn et al., "Guided cost learning: Deep inverse optimal control via policy optimization" ar Xiv, May 2016, 13 pages.
Gu et al, "Continuous deep q-learning with model-based acceleration" arXiv, Mar. 2016, 13 pages.
Gu et al, "Deep reinforcement learning for robotic manipulation with asynchronous off-policy updates" arXiv, Nov. 23, 2016, 9 pages.
Gu et al, "MuProp: Unbiased backpropagation for stochastic neural networks" arXiv, Feb. 2016, 12 pages.
Gu et al., "Deep reinforcement learning for robotic manipulation" arXiv, 2016, 9 pages.
Gupta et al., "Learning dexterous manipulation for a soft robotic hand from human demonstrations" 2016 IEEE/RSJ International Conference on Intelligent Robots and Systems, IROS 2016, Daejeon, South Korea, Oct. 9-14, pp. 3786-3793, 2016, 9 pages.
Hafner et al., "Neural reinforcement learning controllers for a real robot application" 2007 IEEE International Conference on Robotics and Automation, pp. 2098-2103, 2007, 6 pages.
Hafner et al., "Reinforcement learning in feedback control" Machine learning, 84(1-2):137-169, 2011, 33 pages.
Hausknecht, "Cooperation and communication in multiagent deep reinforcement learning" Thesis for the degree of Doctor of Philosophy, University of Texas, Dec. 2016, 85 pages.
Heess et al, "Learning continuous control policies by stochastic value gradients" arXiv, Oct. 2015, 13 pages.

Heess et al., "Continuous control with deep reinforcement learning" International Conference on Learning Representations, 2016, 14 pages.
Hunt et al, "Neural networks for control systems: a survey" Automatica, Nov. 1992, 30 pages.
Kalakrishnan et al, "Learning force control policies for compliant manipulation" IEEE/RSJ International Conference on Intelligent Robots and Systems, Sep. 2011, 6 pages.
Kalakrishnan et al., "Learning objective functions for manipulation" IEEE International Conference on Robotics and Automation, 2013, 6 pages.
Kingma et al, "Adam: a method for stochastic optimization" arXiv, Jan. 2017, 15 pages.
Kohl et al, "Policy gradient reinforcement learning for fast quadrupedal locomotion" Proceeding sof the IEEE International Conference on Robotics and Automation, May 2004, 6 pages.
Levine et al, "End-to-end training of deep visuomotor policies" arXiv, Apr. 2016, 40 pages.
Levine et al, "Learning hand-eye coordination for robotic grasping with deep learning and large-scale data collection" arXiv, Aug. 2016, 12 pages.
Levine et al, "Learning neural network policies with guided policy search under unknown dynamics" NIPS, 2014, 11 pages.
Lillicrap et al, "Continuous control with deep reinforcement learning" arXiv, Jul. 2019, 14 pages.
Matsubara et al, "Learning cpg-based biped locomotion with a policy gradient method" International Journal of Robotics Research, Feb. 2008, 16 pages.
Minh et al, "Asynchronous methods for deep reinforcement learning" arXiv, Jun. 16, 2016, 19 pages.
Mnih et al, "Human-level control through deep reinforcement learning" Nature, 2015, 13 pages.
Muelling et al, "Learning to select and generalize striking movements in robot table tennis" URL <https://www.ias.informatik.tudarmstadt.de/uploads/Publications/Muelling_IJRR_2013.pdf>, 2013, 24 pages.
Nair et al, "Massively parallel methods for deep reinforcement learning" arXiv, Jul. 16, 2015, 14 pages.
Office Action in Chinese Appln. No. 201880014744.5, dated Sep. 22, 2022, 23 pages (with English translation).
Office Action in European Appln. No. 18707406.7, dated Nov. 30, 2021, 9 pages.
Pastor et al, "Skill learning and task outcome prediction for manipulation" IEEE International Conference on Robotics and Automation, May 2011, 7 pages.
PCT International Preliminary Report on Patentability in International Appln. No. PCT/IB2018/000051, dated Aug. 15, 2019, 10 pages.
PCT International Search Report and Written Opinion in International Application No. PCT/IB2018/000051, dated May 14, 2018, 16 pages.
Peters et al, "Policy gradient methods for robotics" IEEE/SJ International Conference on Intelligent Robots and Systems, Oct. 2006, 7 pages.
Pinto et al, "Supersizing self-supervision: Learning to grasp from 50k tries and 700 robot hours" ar Xiv, Sep. 2015, 8 pages.
Popov et al., "Data-efficient Deep Reinforcement Learning for Dexterous Manipulation" arXiv, 2017.
Riedmiller et al, "A direct adaptive method for faster backpropagation learning: The RPOP algorithm" Proceedings of the IEEE International Conference on Neural Networks, 1993, 6 pages.
Riedmiller, "Neural fitted Q iteration—first experiences with a data efficient neural reinforcement learning method" Computer Science, 2005, 12 pages.
Schaal, "Dynamic Movement Primitives-A Framework for Motor Control in Humans and Humanoid Robotics" Computer Science and Neuroscience, 2006, 10 pages.
Schulman et al., "High-dimensional continuous control using generalized advantages estimation" International Conference on Learning Representations, 2016, 14 pages.
Schulman et al., "Trust region policy optimization" International Conference on Machine Learning, pp. 1889-1897, 2015, 16 pages.

(56) References Cited

OTHER PUBLICATIONS

Silver et al, "Deterministic policy gradient algorithms" 31st International Conference on Machine Learning, 2014, 9 pages.
Summons to Attend Oral Proceedings in European Appln. No. 18707406.7, dated Jun. 23, 2023, 13 pages.
Tesauro, "Temporal difference learning and td-gammon" ACM, 1995, 16 pages.
Todorov et al, "Mujoco: a physics engine for model-based control" IEEE/RSJ International Conference on Intelligent Robots and Systems, 2012, 8 pages.
Van Hoof et al., "Learning robot in-hand manipulation with tactile features" 15th IEEE/RAS International Conference on Humanoid Robots, Nov. 2015, 2 pages.
Yahya et al., "Collective robot reinforcement learning with distributed asynchronous guided policy search" arXiv, Oct. 2016, 8 pages.

\* cited by examiner

DATA-EFFICIENT REINFORCEMENT LEARNING FOR CONTINUOUS CONTROL TASKS

CROSS-REFERENCE TO RELATED APPLICATIONS

This application is a continuation of U.S. application Ser. No. 16/882,373, filed on May 22, 2020 (now U.S. Pat. No. 11,741,334), which is a continuation of U.S. application Ser. No. 16/528,260, filed on Jul. 31, 2019 (now U.S. Pat. No. 10,664,725), which is a continuation of and claims priority to PCT Application No. PCT/IB2018/000051, filed on Jan. 31, 2018, which claims priority to U.S. Provisional Application No. 62/452,930, filed on Jan. 31, 2017. The disclosures of the prior applications are considered part of and are incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that trains an actor neural network that is used to select, from a continuous action space, actions to be performed by a reinforcement learning agent interacting with an environment.

In one aspect there is provided a system for training an actor neural network used to select actions to be performed by an agent that interacts with an environment by receiving observations characterizing states of the environment and, in response to each observation, performing an action selected from a continuous space of possible actions. The actor neural network maps observations to next actions in accordance with values of parameters of the actor neural network. The system comprises a plurality of workers. Each worker may be configured to operate independently of each other worker. Each worker may be associated with a respective agent replica that interacts with a respective replica of the environment during the training of the actor neural network. Each worker may be further configured to repeatedly perform operations. The operations may comprise determining current values of the parameters of the actor neural network and of a critic neural network from a shared memory accessible by each of the plurality of workers. The operations may further comprise obtaining a minibatch of experience tuples from a replay memory, each experience tuple comprising a training observation characterizing a training state of the environment, a training action from the continuous space of actions performed by one of the agent replicas in response to the training observation, a training reward received by the agent replica for performing the training action, and a next training observation characterizing a next training state of the environment. The operations may further comprise determining updates to the current values of the parameters of the actor neural network and to the current values of the parameters of the critic neural network. Determining the updates may comprise, for each experience tuple in the minibatch: processing the training observation and the training action in the experience tuple using the critic neural network to determine a neural network output for the experience tuple in accordance with the current values of the parameters of the critic neural network, determining a target neural network output for the experience tuple from the training reward in the experience tuple and the next training observation in the experience tuple, determining an update to the current values of the parameters of the critic neural network using errors between the target neural network outputs and the neural network outputs for the experience tuples in the minibatch, and determining an update to the current values of the parameters of the actor neural network using the critic neural network. The operations may further comprise writing the updates to the current values of the parameters of the actor neural network and to the current values of the parameters of the critic neural network to the shared memory.

In some implementations updates to the neural network parameters are relatively independent of interactions with the environment, improving the efficiency of data use. In some implementations the use of multiple workers allows data collection and network training to be spread out over multiple computers and agents.

In general the agent may be a software agent or a real-world agent. As described later, the agent may be a mechanical agent such as a robot in which case the agent replicas may be replica robots interacting with replica environments; and/or the agent replicas may be software agents interacting with a simulated environment.

In some implementations an agent replica may generate a new experience tuple for the replay memory by interacting with its respective environment replica. For example this may comprise receiving a current observation characterizing a current state of the environment replica interacted with by the agent replica associated with the worker. The process may further comprise selecting a current action to be performed by the agent replica associated with the worker in response to the current observation using the actor neural network and in accordance with the current values of the parameters. The process may then further comprise identifying an actual reward resulting from the agent replica performing the current action in response to the current observation. The process may further comprise receiving a next observation characterizing a next state of the environment replica interacted with by the actor, wherein the environment replica transitioned into the next state from the current state in response to the agent replica performing the current action. The process may further comprise generating a new experience tuple that includes the current observation, the current action, the actual reward, and the next observation, and storing the new experience tuple in the replay memory.

The system may perform multiple iterations of the previously described operations of determining current parameter values, obtaining a minibatch, and determining and writing parameter value updates, prior to selecting a new action to be performed in response to the next observation. The number of iterations performed prior to selecting the new action may be a predetermined number greater than one. Selecting the new action to be performed in response to the next observation may comprises: determining new values of the parameters of the actor neural network from the shared memory; processing the new observation using the actor neural network in accordance with the new values of the parameters to map the new observation to a new next action; and selecting the new action to be performed based on the new next action.

In some implementations determining a target neural network output for the experience tuple may employ a target actor neural network and a target critic neural network, for increased stability. Thus determining a target neural network output for the experience tuple may comprise processing the next training observation using a target actor neural network to determine a predicted next action for the experience tuple in accordance with current values of parameters of the target actor neural network, wherein the target actor neural network is identical to the actor neural network but the current values of the parameters of the target actor neural network are different from the current values of the parameters of the actor neural network; processing the next training observation and the predicted next action for the experience tuple using a target critic neural network to generate a predicted next neural network output in accordance with current values of parameters of the target critic neural network, wherein the target critic neural network is identical to the critic neural network but the current values of the parameters of the target critic neural network are different from the current values of the parameters of the critic neural network; and determining the target neural network output for the experience tuple from the training reward and the predicted next neural network output for the experience tuple. The operations may then further comprise updating the current values of the parameters of the target actor neural network using updated values of the parameters of the actor neural network; and updating the current values of the parameters of the target critic neural network using updated values of the parameters of the critic neural network. In some implementations the current values of the parameters of the target actor neural network and the target critic neural network may be constrained to change only slowly during the training of the actor neural network, for example being updated less frequently than the actor and critic neural networks. For example the system may be configured to determine that a threshold number of writes to the shared memory have occurred since a preceding update to the values of the parameters of the target actor neural network and the target critic neural network, in response updating the current values of the parameters of the target actor neural network and of the target critic neural network.

In some implementations determining an update to the current values of the parameters of the actor neural network using the critic neural network may employ a deep deterministic policy gradient (DDPG) reinforcement learning procedure. In the context of the described system this may comprise processing the training observation in the experience tuple using the actor neural network in accordance with the current values of the parameters of the actor neural network to generate a next action for the training observation; and determining a parameter update for the actor neural network based on, for example dependent upon a product of, (i) a gradient of the critic neural network with respect to the next action taken at the training observation—next action input pair and in accordance with the current values of the parameters of the critic neural network and (ii) the gradient of the actor neural network with respect to the parameters of the actor neural network taken at the training observation and in accordance with current values of the parameters of the actor neural network.

In some implementations of the system each worker may execute independently of each other worker on the same or computer, or on different computers.

In some implementations, the system may be configured to determine that a next state that the environment has transitioned to is a state in which a subtask of a task being performed by the agent replica has been completed. The system may then assign the actual reward to be a reward associated with completion of the subtask by a composite reward function. This can help the system to reliably find solutions to complex problems and can reduce the amount of data/training time needed.

As previously described, an agent replica may interacts with a respective environment replica to compete a task. The system may be configured to identify a trajectory, or sequence of actions and corresponding states that resulted in successful completion of the task by the agent replica or by another actor. The system may then initialize an initial state of the agent replica and the environment to a state that matches one of the states in the trajectory. Initializing an agent in this way can facilitate rapid learning. The successful trajectory may be provided, for example, by a previously trained policy or by a human demonstrator. Initializing the initial state of the agent replica and the environment to a state that matches one of the states in the trajectory may comprise selecting one of the states in the trajectory randomly; and initializing an initial state of the agent replica and the environment to a state that matches the selected state.

In some implementations of the system each worker operates asynchronously from each other worker and each worker writes to and reads from the shared memory asynchronously from each other worker.

Particular embodiments of the subject matter described in this specification can be implemented so as to realize one or more of the following advantages.

A reinforcement learning system can effectively and directly learn an effective action selection policy for an agent in high-dimensional, continuous action spaces, i.e., by training an actor neural network as described in this specification. In particular, by training the actor neural network as described in this specification, the reinforcement learning system can effectively learn an effective action selection policy even for tasks that require fine control of actions and when the action space is intractable for discretizing and then exploring effectively.

More specifically, by training the actor neural network in a distributed manner using multiple workers operating independently and asynchronously, the time required to train the actor neural network can be decreased relative to conventional approaches to training such actor neural networks. By sampling multiple minibatches and writing multiple parameter value updates for each time that the worker selects an action and generates an experience tuple, the training of the actor neural network is more data-efficient, i.e., requires fewer actual interactions of the agent with the environment, than the conventional approaches. Accordingly, the actor neural network can be trained quicker while achieving superior performance on various continuous control tasks. For some tasks, the actor neural network can be trained to allow the agent to complete a continuous control task that previously was not successful, i.e., because training the actor neural network on the task using conventional approaches would require more data than is feasible to collect.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that trains an actor neural network that is used to select actions to be performed by a reinforcement learning agent interacting with an environment to perform a continuous control task. That is, in order to interact with the environment, the agent receives data characterizing the current state of the environment and performs an action from a continuous action space in response to the received data to attempt to perform a task in the environment. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a robot or motion simulation environment, e.g., a driving simulation or a flight simulation, and the agent is a simulated vehicle navigating through the motion simulation to perform some navigation task, e.g., to navigate to a particular point in the environment without violating safety constraints. In these implementations, the actions may be points in a space of possible control inputs to control the simulated user or simulated vehicle.

In some implementations, the environment is a real-world environment and the agent is a mechanical agent interacting with the real-world environment. For example, the agent may be a robot interacting with the environment to accomplish a specific task, e.g., to move to a particular location or to interact with objects in the environment in some desirable way, for example to perform a reach and/or grasp and/or place action. As another example, the agent may be an autonomous or semi-autonomous vehicle navigating through the environment. In these implementations, the actions may be points in a space of possible control inputs to control the robot or the autonomous vehicle.

In some cases, the observations characterize states of the environment using low-dimensional feature vectors that characterize the state of the environment. In these cases, values of different dimensions of the low-dimensional feature vectors may have varying ranges. For example, the observations may include information identifying the current position, e.g., angle, and, optionally, movement, e.g., angular velocity, of the joints of the mechanical agent. The observations may also include information identifying the location of objects in the environment, distances from the mechanical agent to those objects, or both.

In some other cases, the observations characterize states of the environment using high-dimensional pixel inputs from one or more images that characterize the state of the environment, e.g., images of the simulated environment and/or images captured by sensors of the mechanical agent as it interacts with the real-world environment.

Figure 1:
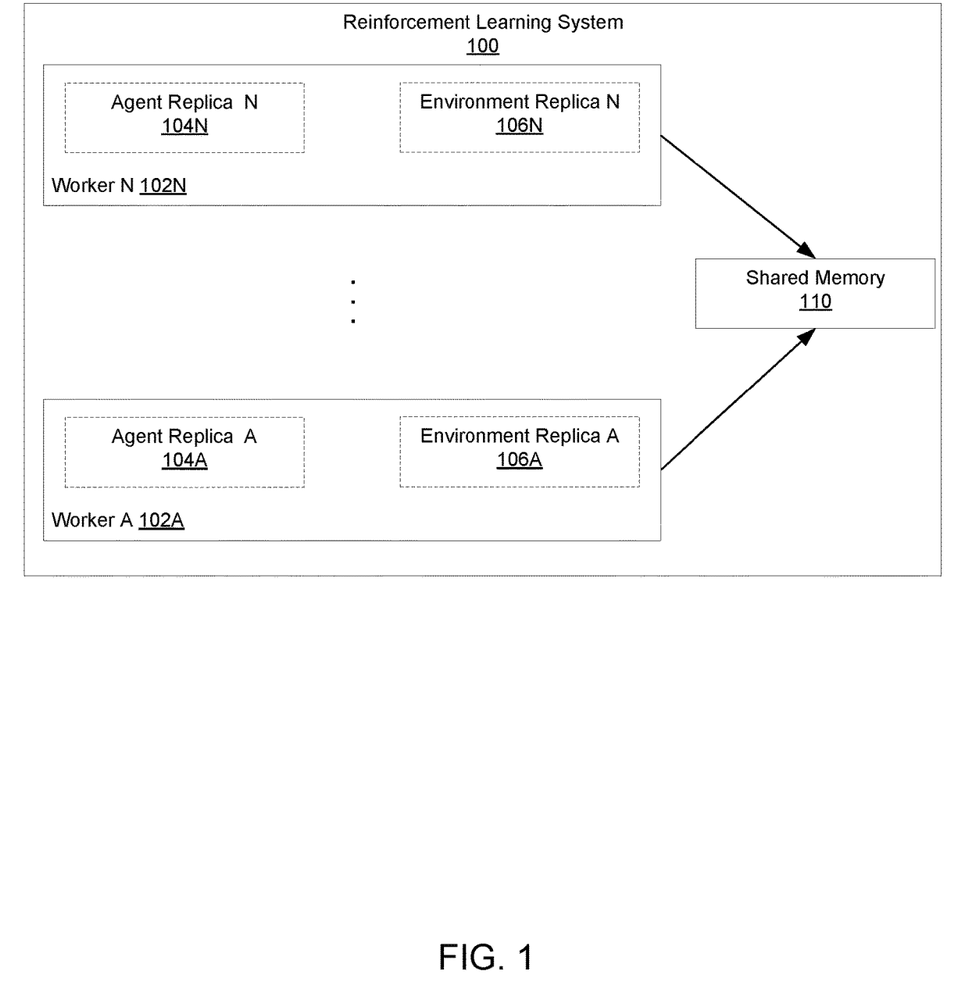
FIG. 1 shows an example reinforcement learning system.

FIG. 1 shows an example reinforcement learning system 100. The reinforcement learning system 100 is an example of a system implemented as computer programs on one or more computers in one or more locations, in which the systems, components, and techniques described below can be implemented.

The reinforcement learning system 100 is configured to train an actor neural network that is used to select actions to be performed by an agent interacting with an environment.

In particular, the actor neural network maps observations to next actions in accordance with values of parameters of the actor neural network (referred to in this specification as actor network parameters). In other words, the actor neural network is to configured to receive as input an observation and to process the observation to generate as output an action from a continuous action space. For example, the output can be a control input for the joints of the mechanical agent, e.g., a vector that sets a respective velocity for each of the joints. Specifically, the action space is continuous as opposed to discrete, which increases the complexity of selecting actions to be performed by the agent and, accordingly, of training the actor neural network.

In particular, the reinforcement learning system 100 trains the actor neural network to determine trained values of the action selection parameters in a manner that is much more data-efficient and computationally-efficient than conventional approaches for training actor neural networks, i.e., neural networks that generate as output actions from a continuous, as opposed to a discrete, action space.

Generally, to train an actor neural network, a system repeatedly performs two training steps: an environment interaction step and a neural network training step.

In the environment interaction step, the system selects actions to be performed by the agent while the agent is interacting with the environment using the actor neural network in order to generate experience tuples. Experience tuples, as will be described in more detail below, each generally include data identifying an observation that was received, an action that was performed in response to the observation, and the effects of performing the action on the environment. The environment interaction step can therefore be time-intensive, as generating each experience tuple requires the agent to perform an action and to obtain data specifying the effects of performing the action.

In the neural network training step, the system updates the values of the actor network parameters on a mini-batch of experience tuples that have already been generated. The neural network training step can therefore be computationally-intensive, as it requires at least determining and back-propagating gradients for each experience tuple in the mini-batch.

During the training, neural network training steps are interleaved with the acquisition of interaction experience, i.e., the environment interaction steps, and the nature of the latter is therefore affected by the state of the former.

More specifically, during the interaction step, conventional approaches use a single actor neural network to select actions performed by a single agent interacting with a single version of the environment.

Additionally, conventional approaches perform a single neural network training step on a mini-batch of experience tuples after each time an action is selected to be performed by the agent. However, such a scheme requires a large amount of experience tuples to be generated during the course of the training of the actor neural network, thereby making the training process relatively data-inefficient because it requires a large amount of training data to be collected in order for the training to be effective.

The reinforcement learning system 100, on the other hand, performs multiple neural network training steps in between each action selection. That is, in between each action selection, the system 100 trains the actor neural network on multiple mini-batches of experience tuples. The number of training steps to be performed between each action selection is generally fixed to a number that is greater than one, e.g., fixed to five, ten, twenty, or forty training steps between every action selection.

Performing multiple training steps between every action selection increases the data-efficiency of the training process. In particular, many fewer experience tuples are required to be generated to train an actor neural network to have an acceptable level of performance than with conventional approaches. For some tasks, performing multiple training steps between every action selection increases the data-efficiency of the training process to such a degree that an agent can effectively learn to perform the task even if this was not previously possible with conventional techniques.

However, because the training step is computationally-intensive, performing multiple training steps between every action selection can increase the computation time of the training process.

To account for and mitigate this increase in computation time, the reinforcement learning system 100 includes multiple workers 102A-N that each operate independently to train the actor neural network by updating values of the actor network parameters that are stored in a shared memory 110 that is accessible to each of the workers 102A-N.

Generally, each worker 102A-N is hardware or software implemented in hardware that is capable of performing the operations for the worker independently from the other workers. In some implementations, each of the workers 102A-N is implemented on a different computer. In other implementations, two or more of the local workers 102A-N are implemented on the same computer but each of these workers execute in a separate thread, process or other hardware or software within the computer capable of performing the computation for the worker independently of the computations being performed by each other worker.

Each worker 102A-N is associated with, i.e., is in communication with and provides instructions to, a respective agent replica 104A-N that interacts with a respective replica 106A-N of the environment during the training of the actor neural network. When the environment is a real-world environment, each worker 102A-N can be associated with a different mechanical agent having the same dynamics and interacting with the real-world environment to perform the same continuous control task. When the environment is a simulated environment, each worker 102A-N can be associated with a different simulated agent having the same simulated dynamics and interacting with a replica of the simulated environment to perform a simulated continuous control task.

During the training, each worker 102A-N asynchronously and independently performs iterations of the environment interaction step interleaved with iterations of the neural network training step for many different episodes of the continuous control task to repeatedly write updates to current values of the actor network parameters to the shared memory 110. Performing these iterations will be described in more detail below with reference to FIGS. 2-5.

Once the training has been completed, e.g., after a threshold number of training iterations have been performed, after a threshold amount of time has elapsed, or after the actor neural network achieves a satisfactory level of performance on the task, the reinforcement learning system 100 can use the values of the actor network parameters that are stored in the shared memory 110 as the trained values of the actor network parameters. In particular, the reinforcement learning system 100 can use the trained values to select actions to be performed by the agent, store the trained values for later use, or provide the trained values to another system for use in selecting actions to be performed by the agent while performing the continuous control task.

Figure 2:
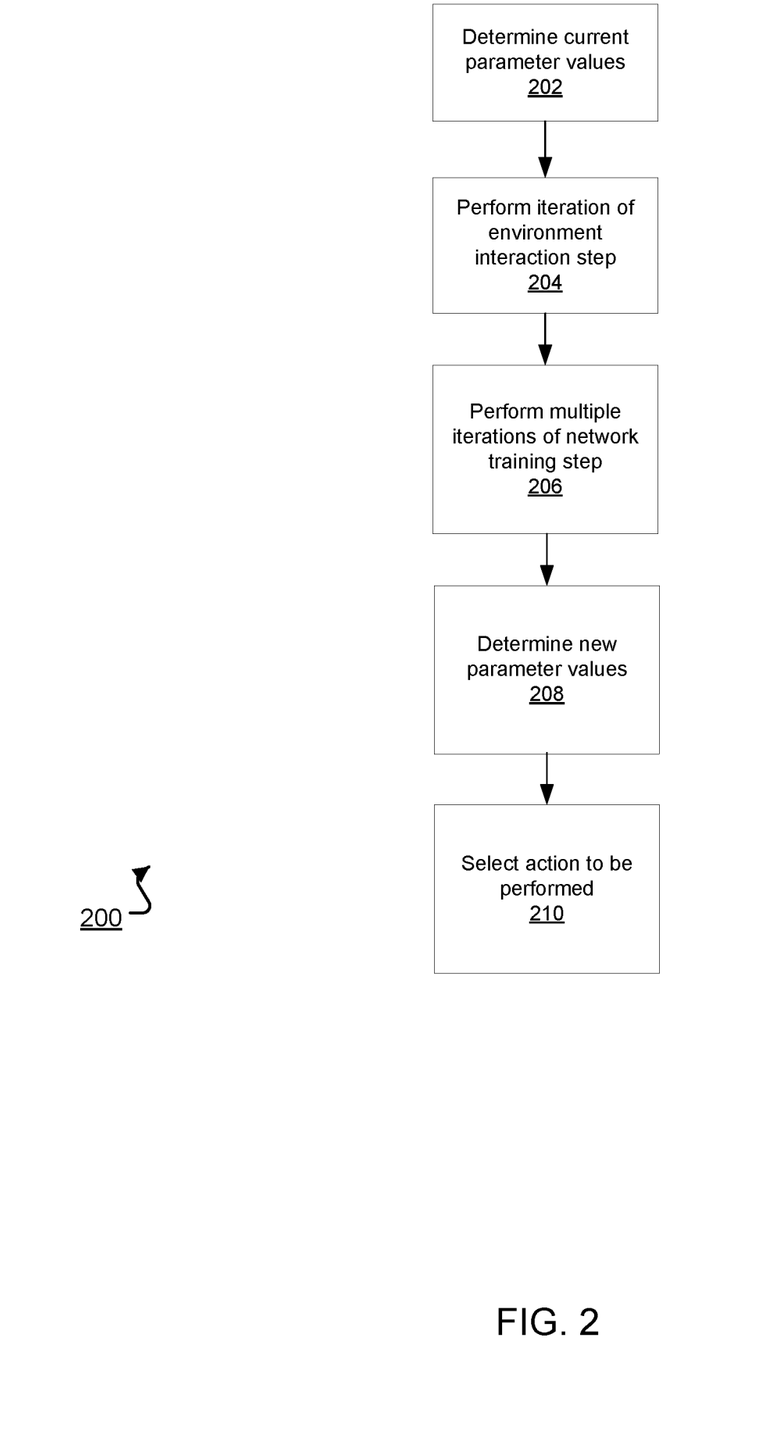
FIG. 2 is a flow diagram of an example process for training an actor neural network.

FIG. 2 is a flow diagram of an example process 200 for training an actor neural network. For convenience, the process 200 will be described as being performed by a system of one or more computers located in one or more locations. For example, a worker in a reinforcement learning system, e.g., one of the workers in the reinforcement learning system 100 of FIG. 1, appropriately programmed, can perform the process 200.

The worker determines current values of the actor network parameters from the shared memory (step 202). That is, the worker accesses the shared memory to obtain the values of the parameters that are currently stored in the memory.

The worker performs an iteration of the environment interaction step in accordance with the current values of the actor network parameters to generate an experience tuple (step 204). As part of performing the iteration of the environment interaction step, the worker selects an action to be performed by the agent replica in response to a current observation, which results in the worker receiving a new observation characterizing a new state of the environment replica. Performing an iteration of the environment interaction step is described in more detail below with reference to FIG. 3.

Before selecting an action to be performed by the agent replica in response to the new observation, the worker performs a fixed number of iterations of the network training step (step 206). Generally, the fixed number is a number that is greater than one, e.g., five, ten, twenty, or forty iterations. Performing an iteration of the network training step is described in more detail below with reference to FIG. 4.

The worker determines new values of the actor network parameters from the shared memory (step 208) and selects an action to be performed by the agent replica in response to the new observation in accordance with the new values (step 210). The worker can then generate another experience tuple based on the effects of the agent performing the new action in response to the new observation.

To train the actor neural network, each worker performs the process 200 many different times for many different episodes of the continuous control task and asynchronously from the other workers.

In some cases, each worker initializes each episode of the continuous control task at a random state within the environment or at one of a pre-determined set of states within the environment.

In some other cases, however, the workers have access to data identifying one or more trajectories of actions and corresponding states that resulted in successful completion of the task by the agent replica or by another actor, e.g., by another mechanical agent or by a human.

In these cases, the worker can initialize an initial state of some or all of the episodes to a state that matches one of the states in one of the trajectories. For example, the worker can select states from the one or more trajectories randomly to be the initial state of a given episode.

Figure 3:
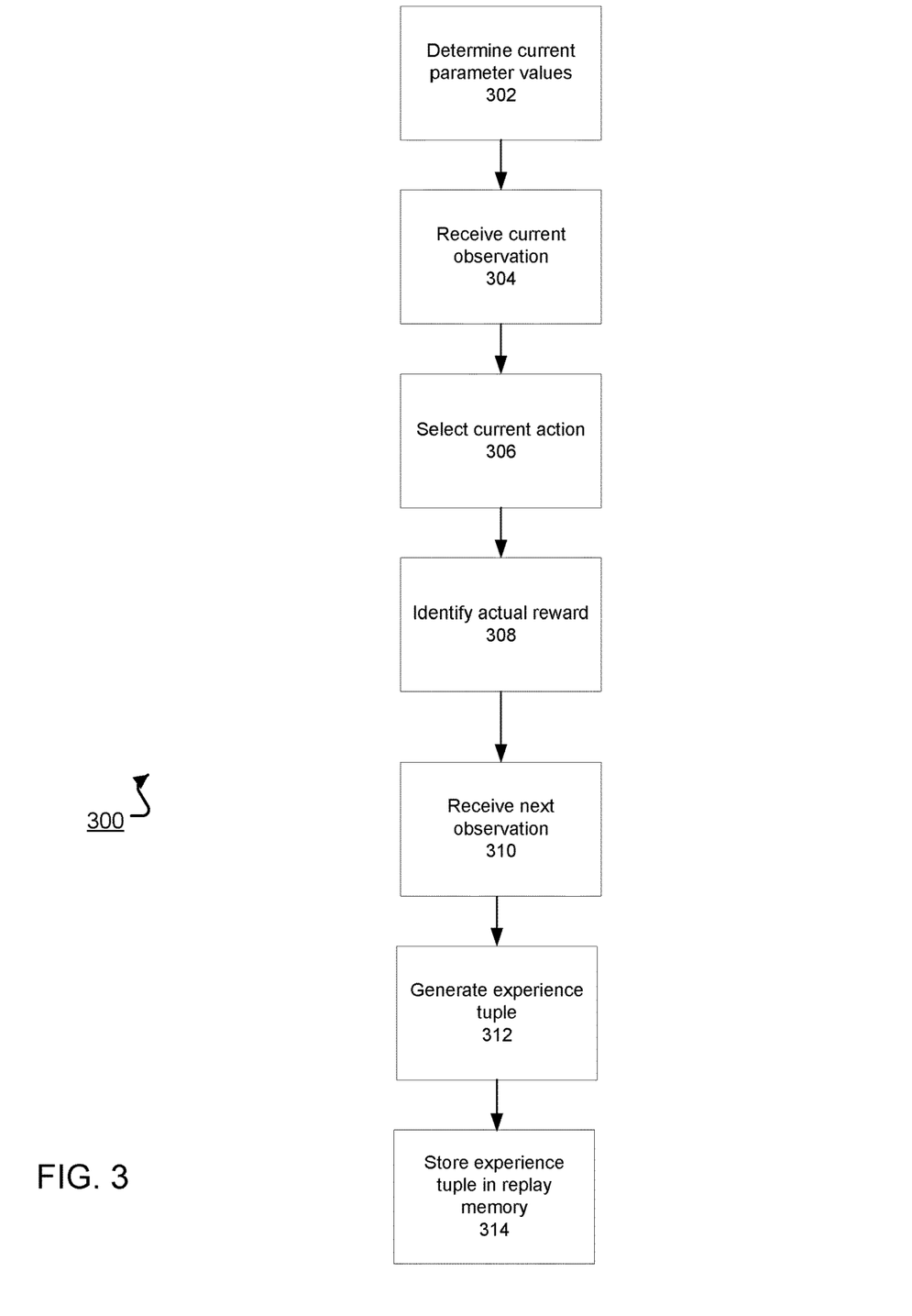
FIG. 3 is a flow diagram of an example process for performing an environment interaction step.

FIG. 3 is a flow diagram of an example process 300 for performing an iteration of an environment interaction step. For convenience, the process 300 will be described as being performed by a system of one or more computers located in one or more locations. For example, a worker in a reinforcement learning system, e.g., one of the workers in the reinforcement learning system 100 of FIG. 1, appropriately programmed, can perform the process 300.

The worker determines current values of the actor network parameters from the shared memory (step 302).

The worker receives a current observation characterizing a current state of the environment replica interacted with by the agent replica associated with the worker (step 304).

The worker selects a current action to be performed by the agent replica associated with the worker in response to the current observation using the actor neural network and in accordance with the current values of the actor network parameters (step 306). In particular, the worker processes the current observation using the actor neural network and in accordance with the current values of the actor network parameters to map the current observation to an output action. In some implementations, the worker selects the output action as the current action to be performed. In some other implementations, to increase exploration, the worker adds noise sampled from a prior distribution to the output action to generate the current action.

The worker identifies an actual reward resulting from the agent replica performing the current action in response to the current observation (step 308).

In some cases, the reward is a sparse reward, e.g., a reward that is a positive value, e.g., one, when the continuous control task has been completed as a result of the agent performing the current action and zero when the task has not been completed.

In other cases, to further improve the data-efficiency of the training of the actor neural network, the worker uses a composite reward function to generate a reward that is less sparse than conventional rewards and therefore improves the training of the actor neural network.

In particular, the worker maintains data identifying observations that characterize states in which a subtask of the continuous control task being performed by the agent replica has been completed.

In some cases, the worker also maintains data identifying rewards associated with completing each of the subtasks. In these cases, the worker determines, from the next observation and the maintained data, whether the next state that the environment transitioned to is a state in which a given subtask of a task being performed by the agent replica has been completed and, if so, assigns the actual reward to be the reward associated with completion of the given subtask, i.e., instead of zero as in a conventional reward scheme. Thus, the training is augmented with additional feedback that indicates how well the agent is performing on the task.

In some other cases, the worker also maintains a smoothly varying composite reward function that assigns rewards differently while the agent replica is performing different subtasks. For example, the function may assign a reward that is equal to the subtask completion reward assigned above plus a reward that is based on a distance from the agent to an object in the environment that is associated with the current subtask.

The worker receives a next observation characterizing a next state of the environment replica interacted with by the agent replica (step 310). In particular, the next state is a state that the environment replica transitioned into as a result of the agent replica performing the current action.

The worker generates a new experience tuple that includes the current observation, the current action, the actual reward, and the next observation (step 312) and stores the new experience tuple in a replay memory (step 314).

In some cases, the replay memory is shared between and accessible by all of the workers.

In other cases, the replay memory is specific to only the worker and each worker is associated with a unique replay memory.

Figure 4:
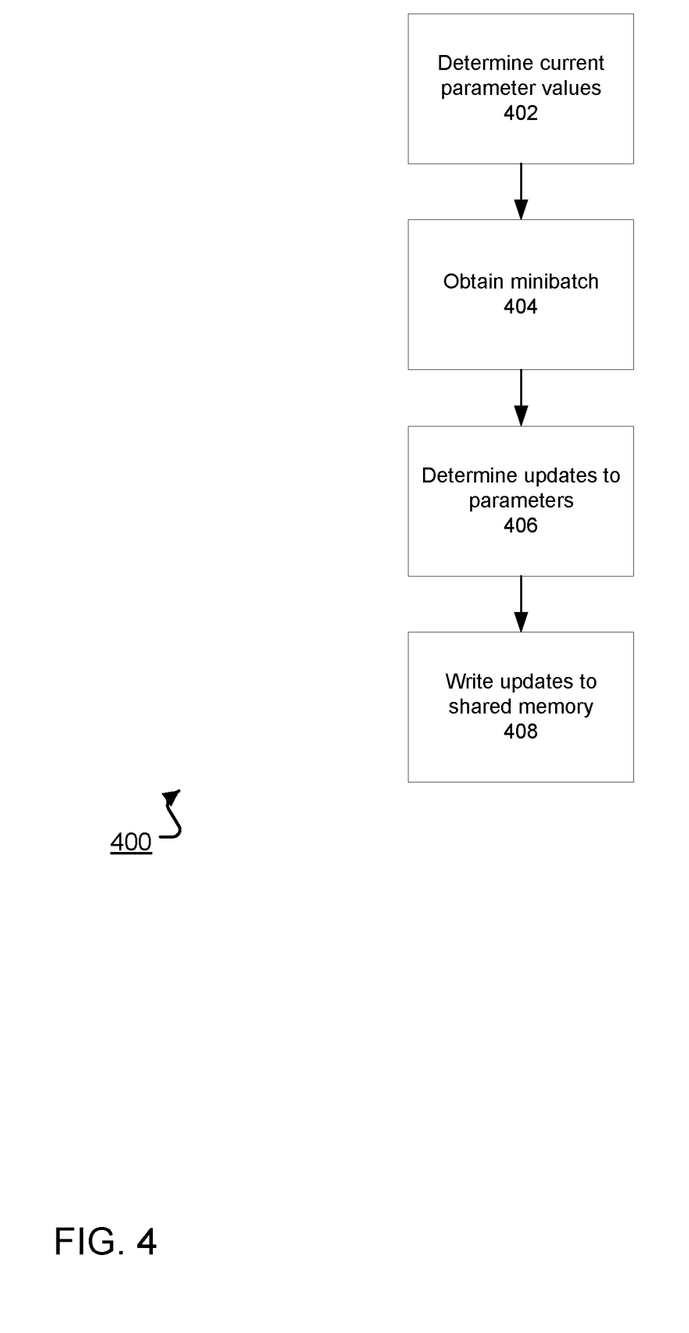
FIG. 4 is a flow diagram of an example process for performing a network training step.

FIG. 4 is a flow diagram of an example process 400 for performing a network training step. For convenience, the process 400 will be described as being performed by a system of one or more computers located in one or more locations. For example, a worker in a reinforcement learning system, e.g., one of the workers in the reinforcement learning system 100 of FIG. 1, appropriately programmed, appropriately programmed, can perform the process 400.

The worker determines current values of the actor network parameters and of parameters of a critic neural network from the shared memory (step 402). The critic neural network is a neural network that is configured to process an input observation and an input action in accordance with the current values of the parameters of the critic neural network (referred to in this specification as "critic network parameters") to generate a neural network output that is an estimate of a return, i.e., a time-discounted sum of future actual rewards, that would result from the agent replica performing the input action in response to the input observation.

The worker obtains a minibatch of experience tuples from a replay memory, i.e., samples a minibatch from either a memory that is shared among all workers or a memory that is specific to the worker (step 404). Each experience tuple includes a training observation characterizing a training state of the environment, a training action from the continuous space of actions performed by one of the agent replicas in response to the training observation, a training reward received by the agent replica for performing the training action, and a next training observation characterizing a next training state of the environment.

The worker determines updates to the current values of the actor network parameters and the critic network parameters using the minibatch (step 406). In general, the worker determines the updates by training the actor neural network and the critic neural network on the minibatch using a deep deterministic policy gradient (DDPG) reinforcement learning technique. Determining these updates using the DDPG technique is described at a high-level below with reference to FIG. 5 and in more detail in Timothy P. Lillicrap, Jonathan J. Hunt, Alexander Pritzel, Nicolas Heess, Tom Erez, Yuval Tassa, David Silver, Daan Wierstra, CONTINUOUS CONTROL WITH DEEP REINFORCEMENT LEARNING (arXiv:1509.02971), and U.S. Pat. No. 10,776,692, and titled "CONTINUOUS CONTROL WITH DEEP REINFORCEMENT LEARNING," both of which are hereby incorporated by reference herein in their entirety.

The worker writes the updates to the current values of the parameters of the actor neural network and to the current values of the parameters of the critic neural network to the shared memory (step 408). In particular, the worker determines new values for the parameters using the DDPG technique and then writes the new values to the shared memory, i.e., by overwriting the values currently stored in the memory.

Figure 5:
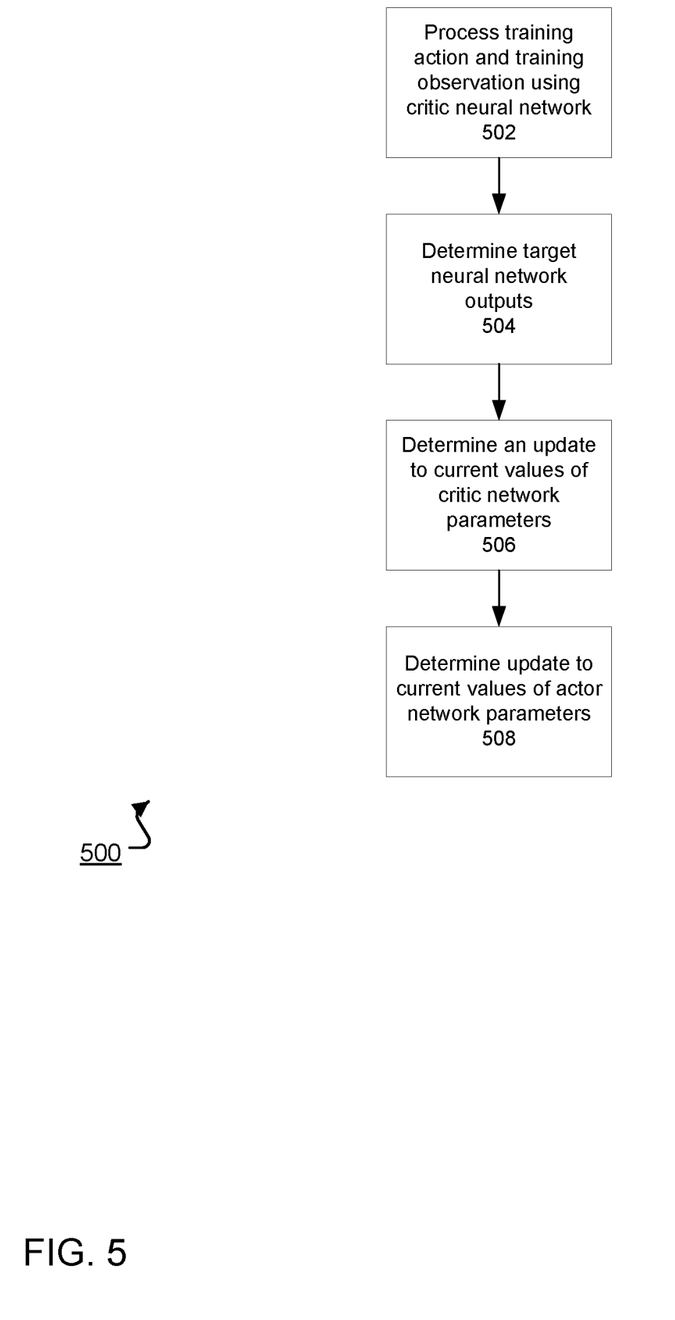
FIG. 5 is a flow diagram of an example process for generating parameter value updates using a DDPG technique.

FIG. 5 is a flow diagram of an example process 500 for determining a parameter value update using a DDPG technique. For convenience, the process 500 will be described as being performed by a system of one or more computers located in one or more locations. For example, a worker in a reinforcement learning system, e.g., one of the workers in the reinforcement learning system 100 of FIG. 1, appropriately programmed, can perform the process 500.

For each experience tuple in the minibatch, the worker processes the training observation and the training action in the experience tuple using the critic neural network to determine a neural network output for the experience tuple in accordance with the current values of the parameters of the critic neural network (step 502).

For each experience tuple in the minibatch, the worker determines a target neural network output for the experience tuple from the training reward in the experience tuple and the next training observation in the experience tuple (step 504).

In particular, to determine the target neural network output for an experience tuple, the worker processes the next training observation using a target actor neural network to determine a predicted next action for the experience tuple in accordance with current values of parameters of the target actor neural network. The target actor neural network is identical to the actor neural network but the current values of the parameters of the target actor neural network generally differ from the current values of the parameters of the actor neural network.

The worker then processes the next training observation and the predicted next action for the experience tuple using a target critic neural network to generate a predicted next neural network output in accordance with current values of parameters of the target critic neural network. The target critic neural network is identical to the critic neural network but the current values of the parameters of the target critic neural network are different from the current values of the parameters of the critic neural network.

The worker then determines the target neural network output for the experience tuple from the training reward and the predicted next neural network output for the experience tuple, e.g., by computing a time-discounted sum of the training reward and the predicted next neural network output.

The worker determines an update to the current values of the parameters of the critic neural network using errors between the target neural network outputs and the neural network outputs for the experience tuples in the minibatch (step 506).

The worker determines an update to the current values of the parameters of the actor neural network using the critic neural network (step 508).

Generally, to update the current values of the actor network parameters, the worker processes the training observation in the experience tuple using the actor neural network in accordance with the current values of the parameters of the actor neural network to generate a next action for the training observation and determines a parameter update for the actor neural network based on (i) a gradient of the critic neural network with respect to the next action taken at the training observation—next action input pair and in accordance with the current values of the parameters of the critic neural network and (ii) the gradient of the actor neural network with respect to the parameters of the actor neural network taken at the training observation and in accordance with current values of the parameters of the actor neural network.

Determining these updates, i.e., determining new values for the actor and critic network parameters, using the target neural network outputs and the neural network outputs for the tuples using the DDPG technique is described in more detail in Timothy P. Lillicrap, Jonathan J. Hunt, Alexander Pritzel, Nicolas Heess, Tom Erez, Yuval Tassa, David Silver, Daan Wierstra, CONTINUOUS CONTROL WITH DEEP REINFORCEMENT LEARNING, and U.S. Pat. No. 10,776,692, and titled "CONTINUOUS CONTROL WITH DEEP REINFORCEMENT LEARNING." Both of these are hereby incorporated by reference herein in their entirety.

In some cases, during the training, the current values of the parameters of the target actor neural network and the target critic neural network are constrained to change slowly. In these cases, the worker can update the current values of the parameters of the target actor neural network using updated values of the parameters of the actor neural network and updates the current values of the parameters of the target critic neural network using updated values of the parameters of the critic neural network by, for each of the target networks, determining a weighted sum between the current values of the target network parameters and the corresponding updated values.

In other cases, the worker determines whether a threshold number of writes to the shared memory have occurred since a preceding update to the values of the parameters of the target actor neural network and the target critic neural network and, only if the threshold number of writes have occurred, updates the current values of the parameters of the target actor neural network and the current values of the parameters of the target critic neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for training an actor neural network used to select actions to be performed by an agent that interacts with an environment by receiving observations characterizing states of the environment and, in response to each observation, performing an action selected from a continuous space of possible actions, wherein the actor neural network maps observations to next actions in accordance with values of parameters of the actor neural network, and wherein the system comprises:

a plurality of workers, each of the plurality of workers having access to a shared memory configured to store current parameters of the actor neural network,
wherein each worker is configured to operate independently of each other worker,
wherein each worker is configured to communicate with and provide instructions to a respective agent replica that interacts with a respective replica of the environment during the training of the actor neural network,
wherein each worker is configured to repeatedly perform (i) a set of updating operations comprising determining that a threshold number of writes to the shared memory have occurred since a preceding update to the values of the parameters of the actor neural network, and in response to the determination, updating current values of the parameters of the actor neural network in the shared memory, and (ii) a set of acting operations to control the respective agent replica using the actor neural network to perform an action in the respective replica of the environment in order to generate training data for training the actor neural network,
wherein the set of the acting operations comprises:
receiving a current observation characterizing a current state of the environment replica interacted with by the agent replica associated with the worker,
selecting a current action to be performed by the agent replica associated with the worker in response to the current observation using the actor neural network and in accordance with the current values of the parameters,
identifying an actual reward resulting from the agent replica performing the current action in response to the current observation, and
receiving a next observation characterizing a next state of the environment replica interacted with by the agent replica, wherein the environment replica transitioned into the next state from the current state in response to the agent replica performing the current action, and
wherein each worker performs a plurality of iterations of the set of updating operations after selecting the current action and prior to selecting a new action in response to the next observation.

2. The system of claim 1, the set of updating operations comprising:
determining current values of the parameters of the actor neural network and of a critic neural network from the shared memory accessible by each of the plurality of workers;
obtaining a minibatch of experience tuples from a replay memory, each experience tuple comprising a training observation characterizing a training state of the environment, a training action from the continuous space of actions performed by one of the agent replicas in response to the training observation, a training reward received by the agent replica for performing the training action, and a next training observation characterizing a next training state of the environment;
determining updates to the current values of the parameters of the actor neural network and to the current values of the parameters of the critic neural network using the minibatch of experience tuples; and writing the updates to the current values of the parameters of the actor neural network and to the current values of the parameters of the critic neural network to the shared memory.

3. The system of claim 2, the acting operations further comprising:
generating a new experience tuple that includes the current observation, the current action, the actual reward, and the next observation, and
storing the new experience tuple in the replay memory.

4. The system of claim 2, wherein selecting the new action to be performed in response to the next observation comprises:
determining new values of the parameters of the actor neural network from the shared memory;
processing the new observation using the actor neural network in accordance with the new values of the parameters to map the new observation to a new next action; and
selecting the new action to be performed based on the new next action.

5. The system of claim 1, wherein each worker executes independently of each other worker on the same computer.

6. The system of claim 1, wherein each worker executes independently of each other worker on different computers.

7. The system of claim 3, the acting operations further comprising:
determining that the next state that the environment transitioned to is a state in which a subtask of a task being performed by the agent replica has been completed; and
assigning the actual reward to be a reward associated with completion of the subtask by a composite reward function.

8. The system of claim 1, wherein the agent replica interacts with the environment replica to complete a task, and wherein the acting operations further comprise:
identifying a trajectory of actions and corresponding states that resulted in successful completion of the task by the agent replica or by another actor; and
initializing an initial state of the agent replica and the environment to a state that matches one of the states in the trajectory.

9. The system of claim 8, wherein initializing the initial state of the agent replica and the environment to a state that matches one of the states in the trajectory comprises:
selecting one of the states in the trajectory randomly; and
initializing an initial state of the agent replica and the environment to a state that matches the selected state.

10. The system of claim 1, wherein each worker operates asynchronously from each other worker and wherein each worker writes to and reads from a shared memory storing the current values of the parameters asynchronously from each other worker.

11. The system of claim 1, wherein the plurality of iterations is a predetermined number of iterations greater than one.

* * * * *